April 24, 1962 T. C. WALDROP 3,031,241
SWAB RUBBER UNIT FOR WELL SWAB
Filed May 4, 1961

THOMAS C. WALDROP
INVENTOR.

BY

ATTORNEY

United States Patent Office 3,031,241
Patented Apr. 24, 1962

3,031,241
SWAB RUBBER UNIT FOR WELL SWAB
Thomas C. Waldrop, Arlington, Tex., assignor to Empire Rubber Co., Grapevine, Tex., a corporation of Texas
Filed May 4, 1961, Ser. No. 107,846
3 Claims. (Cl. 309—52)

This invention relates to a well swab adapted to be lowered in a well pipe or tubing on a wire line and to elevate well fluids in the pipe or tubing upon raising the swab therein, and it concerns more particularly a swab rubber unit for such a swab as hereinafter described.

The swab rubber unit of this invention is an improvement over the swab rubber unit for well swabs of the type generally shown and described in Patent No. 2,633,808, April 7, 1953, issued to Jack C. Webber.

The Webber patent above referred to shows, FIGS. 1 to 4, a well swab having a swab rubber unit which is molded of resilient material, such as rubber, and has a plurality of longitudinally spaced inverted frusto-conical, radially outwardly and upwardly inclined flexible annular rib-like sealing rings or cups formed on a central tubular core which, as shown, is bonded directly to a mandrel forming a structural part of the swab, but which in practice may be also formed on a separate sleeve receivable on such a mandrel whereby the swab rubber unit, together with the sleeve, is expendable.

An advantageous feature of the swab rubber unit shown in the Webber patent, as compared to swab rubber units previously employed having large wire reinforced single cups designed to carry the entire load of fluids being displaced from a well pipe or tubing, and which are characterized by their inflexibility, is that the swab rubber unit shown in the patent, because of its flexibility, is less likely to be damaged upon impact with fixed objects which may obstruct its free movement thru the well pipe or tubing.

Another advantageous feature of the arrangement shown in the patent is that the rib-like sealing rings or cups, which are of slightly less diameter than the well pipe or tubing but are normally inclined radially outwardly and upwardly, whereby the swab may be readily lowered in a well pipe or tubing, are each designed to resist predetermined pressure differentials on opposite sides thereof, so that each carries its proportionate share of the load of a column of fluid in the well pipe or tubing.

The sealing rings described in the Webber patent are designed to occupy, during various phases of operational loading, all of the following positions:

(1) A position at rest in which the sealing rings are not in contact with the tubing wall, (2) A position caused by intermediate or optimum loading, in which the sealing rings are deflected downwardly and outwardly to contact the tubing wall and are substantially perpendicular to the tubing wall, (3) A position caused by loading in excess of the design capacity of the sealing rings, in which they are flexed downwardly from the position 2 described above.

An object of this invention is to provide an improved swab rubber unit having incorporated therein all of the advantages and safety of the arrangement taught by the Webber patent, while at the same time being characterized by its substantially greater lifting capacity.

This invention contemplates a swab rubber unit in which a series of radially outwardly extending annular ribs, of smaller diameter than the rib-like sealing rings or cups, are formed on the central tubular core, immediately below the sealing rings or cups, respectively, for abutment against the under sides of the sealing rings or cups to resist downward flexing movement thereof, whereby the sealing rings or cups are reinforced or backed up by the annular ribs below them and are thereby adapted to lift greater loads upon movement of the swab in a well pipe or tubing, due to the sealing rings in this invention being prevented at all times from assuming the position 3 or "overloaded" position taught as desirable by Webber.

In a copending application, Serial No. 107,845 filed concurrently herewith, I have shown and described three separate forms of the invention in which the central tubular core as well as the flexible sealing rings or cups and the annular reinforcing or back up ribs below them are of molded rubber construction.

This application relates to still another form of the invention in which the central tubular core comprises a metal sleeve having the flexible sealing rings or cups molded thereon and having the annular reinforcing or back up ribs below the respective sealing rings or cups, which in the form shown are rigid, formed integrally therewith.

The invention will be readily understood by referring to the following description and the accompanying drawing, in which.

Figures 1, 2:
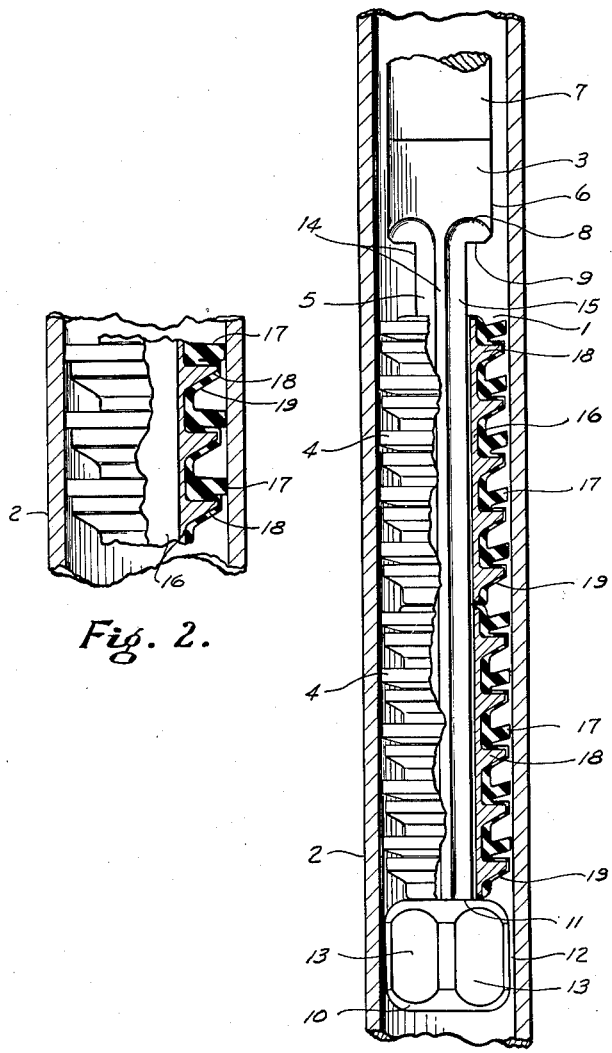
FIG. 1 is an elevational view, partly in section taken on a median line, showing a swab under no load but operatively positioned in a well pipe or tubing, the swab including a mandrel having a swab rubber unit embodying this invention received thereon, and showing the flexible sealing rings or cups, which are reinforced or backed up by the annular ribs below them, at rest.
FIG. 2 is an elevational view, partly in section taken on a median line, showing fragmentarily the apparatus illustrated in FIG. 1, and showing the flexible sealing rings or cups in loaded positions.

Referring to FIG. 1 of the drawing, the numeral 1 designates generally a well swab which is similar to the swab shown in Patent No. 2,919,167, December 29, 1959, issued to Raymond G. Taylor, Jr., and which is operatively positioned in a well pipe or tubing, indicated by the numeral 2.

The swab 1 includes a mandrel 3 having swab rubber units embodying this invention, as hereinafter described, two of which are shown, each designated generally by the numeral 4, received thereon.

The mandrel 3 includes an elongated body 5 having secured to its upper extremity a connector head 6 which is removably connected to a wire rope socket 7, shown fragmentarily. The connector head 6 is provided with arcuately convergent surfaces 8 leading to radially extending stop shoulders 9 at the lower extremity of the connector head 6.

On the lower end of the mandrel body 5 is a guide nose 10 having a seating surface 11 at its upper end, and having a plurality of circumferentially spaced ribs 12 and flutes 13 disposed about its periphery for enabling the flow of fluid therepast as the swab 1 is being run into the well pipe or tubing 2.

The body 5 of the mandrel 3 is provided with a suitable number of circumferentially spaced longitudinally extended ribs 14 and includes channels 15 providing flow passages between the ribs 14.

The swab rubber units 4 each include a central tubular core 16, which is formed of metal and is centered about the body 5 by the ribs 14.

The central tubular core 16, which is formed of metal, or other rigid or semi-rigid material, and which corresponds to the central tubular core of the swab rubber unit shown in the Webber patent, FIGS. 1 to 4, has a plurality of longitudinally spaced flexible, radially outwardly and upwardly inclined rib-like sealing rings or cups 17, formed of molded resilient material such as rubber, corresponding to the flexible sealing rings or cups shown in the Webber patent, formed thereon.

In their at rest positions, as shown in FIG. 1, the flexible sealing rings or cups 17 have a diameter slightly less than the diameter of the well pipe or tubing 2.

A series of radially outwardly extending annular ribs 18, of smaller diameter than the flexible sealing rings or cups 17, are formed on the central tubular core 16, integrally therewith, immediately below the sealing rings or cups 17, respectively, for abutment against the under sides of the sealing rings or cups 17 to resist downward flexing movement thereof, whereby the sealing rings or cups 12 are reinforced or backed up by the annular ribs 18 below them and are thereby adapted to lift greater loads upon upward movement of the swab 1 in the well pipe or tubing 2.

The portions of the flexible sealing rings or cups 17 which extend radially outwardly beyond the annular ribs 18, being relatively short, are characterized by their relative stiffness whereby they resist downward flexing.

The annular reinforcing or back up ribs 18 are characterized by planar upper faces which extend radially outwardly from the central tubular core 16, perpendicular to its longitudinal axis, and as viewed in sectional elevation, intersect the under sides of the corresponding flexible sealing rings or cups 17 at acute angles.

The annular reinforcing or back up ribs 18, because of their relatively rigid construction, positively limit downward flexing movement of the flexible sealing rings or cups 17, and because of their smaller diameter they do not frictionally engage the well pipe or tubing 2 upon moving the swab 1 upwardly therein.

For convenience in manufacturing, the exterior surface of the central tubular core 16, including opposite ends thereof, the annular metal ribs 18, and the space between the annular metal ribs 18 and the flexible sealing rings or cups 17, advantageously may be completely enclosed in a continuous web or sheath 19, of variable thickness, of molded resilient material such as rubber, which comprises the material of the flexible sealing rings or cups 17.

The invention may be modified in various ways without departing from the spirit and scope thereof.

I claim:

1. In a swab rubber unit for a well swab, the combination of a central tubular core having a plurality of longitudinally spaced, flexible rib-like sealing rings or cups formed thereon and inclined radially outwardly and upwardly therefrom, the flexible sealing rings or cups having a diameter in their at rest positions corresponding substantially to the diameter of a well pipe or tubing, and a series of radially outwardly extending annular ribs, of smaller diameter than the well pipe or tubing, formed on the central tubular core, immediately below the sealing rings or cups, respectively, for abutment against the under sides of the sealing rings or cups to resist downward flexing movement thereof, the central tubular core comprising a metal sleeve having the flexible sealing rings or cups molded thereon and having the annular ribs formed integrally therewith.

2. The structure of claim 1, the annular ribs being characterized by planar upper faces which extend radially outwardly from the central tubular core, perpendicular to its longitudinal axis, and as viewed in sectional elevation, intersect the under sides of the corresponding flexible sealing rings or cups at acute angles.

3. The structure of claim 1, the flexible sealing rings or cups being formed of molded resilient material and the annular ribs being formed of the metal of the sleeve, the exterior surface of the central tubular core, including the opposite ends thereof, the annular ribs, and the space between the annular ribs and the flexible sealing rings or cups being completely enclosed in a continuous web or sheath, of variable thickness, of molded resilient material.

No references cited.